(12) United States Patent
Kimmitt (10) Patent No.: US 6,788,682 B1
(45) Date of Patent: Sep. 7, 2004

(54) MAPPING OF PACKETS BETWEEN LINKS OF TRUNK GROUPS USING MUX/DEMUX DEVICES

(75) Inventor: Myles Kimmitt, Shrewsbury, MA (US)

(73) Assignee: 3Com Corporation, Santa Clara, CA (US)

( * ) Notice: Subject to any disclaimer, the term of this patent is extended or adjusted under 35 U.S.C. 154(b) by 779 days.

(21) Appl. No.: 09/630,492

(22) Filed: Aug. 2, 2000

(51) Int. Cl.$^7$ .............................. H04J 3/02; H04L 12/56
(52) U.S. Cl. ...................................... 370/389; 370/537
(58) Field of Search ................................ 370/422, 396, 370/464, 392, 468, 351, 445, 446, 389, 423, 395.31, 229, 216; 709/105, 226; H04L 12/56, 12/26, 12/44

(56) References Cited

U.S. PATENT DOCUMENTS

| | | | | |
|---|---|---|---|---|
| 5,162,791 A | * | 11/1992 | Heegard | 340/825.5 |
| 5,617,417 A | * | 4/1997 | Sathe et al. | 370/394 |
| 5,802,054 A | * | 9/1998 | Bellenger | 370/401 |
| 6,088,354 A | * | 7/2000 | Lenell et al. | 370/389 |
| 6,111,877 A | * | 8/2000 | Wilford et al. | 370/392 |
| 6,363,077 B1 | * | 3/2002 | Wong et al. | 370/422 |
| 6,463,479 B1 | * | 10/2002 | Jennings et al. | 709/250 |
| 6,496,502 B1 | * | 12/2002 | Fite et al. | 370/389 |

OTHER PUBLICATIONS

Part 3: Carrier sense multiple access with collision detection (CSMA/CD) access method and physical layer specifications, IEE Std 802.3, 1998 Edition, p. 58 section 4.2.5.*

Amendment to Carrier Sense Multiple Access with Collision Detection (CSMA/CD)—Access Method and Physical Layer Specifications—Aggregation of Multiple Link Segments, LAN MAN Standards Committee of the IEEE Computer Society, Amendment to IEEE Std 802.3, 1998 Edition, © 2000.

* cited by examiner

*Primary Examiner*—Huy D. Vu
*Assistant Examiner*—Toan Nguyen
(74) *Attorney, Agent, or Firm*—Weingarten, Schurgin, Gagnebin & Lebovici LLP (57) ABSTRACT

A method and apparatus for mapping packets received over a first trunk group comprising n links to a second trunk group comprising m links. A first Mux/Demux device receives packets over the n communication links at n corresponding input ports. The first Mux/Demux device inserts within each received packet a port identifier tag that identifies the port on which the respective packet is received. The packets are transmitted over a communications link for receipt by a second Mux/Demux device. The second Mux/Demux device has m output ports for communicating over the m links of the second trunk group. A port translation table is maintained at the second Mux/Demux devices. The port translation table is indexed by the port identifier tag within the received packets to identify which of the m output ports of the second Mux/Demux device should be employed for transmission of the respective packet. Each packet is transmitted out of the corresponding port identified within the port translation table.

7 Claims, 3 Drawing Sheets

MAPPING OF PACKETS BETWEEN LINKS OF TRUNK GROUPS USING MUX/DEMUX DEVICES

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to trunking techniques employed in data communication systems and more specifically to a method and apparatus for directing a packet received at a first Mux/Demux device at a communications link comprising a link within a first trunk group to a another link coupled to an output of a second Mux/Demux device and comprising a link within a second trunk group.

As is known in the art, data contained on a higher speed local area network link may be communicated over a plurality of lower speed network links that are organized as a trunk group. In this manner the lower speed links that typically employ older technologies may be aggregated to carry higher bandwidth data. Trunk Mux/Demux devices are commonly used for multiplexing packets received over multiple input links of a trunk group to a single output link or demultiplexing packets received over a single high-speed link for transmission over selected lower speed links of a trunk group.

There are well known limitations with respect to trunking systems which result in a statistical bandwidth and an average bandwidth performance that is less than the sum of the lower speed trunk group links. Whole packets are sent down individual links and streams of packets having the same source and destination addresses are sent down the same link to maintain packet order. Packet ordering is typically required for correct operation by a number of higher level protocols. A need to maintain complete packets and to keep packets in order places higher bandwidth demands on the traffic carrying links and may preclude the trunk from obtaining the theoretically achievable bandwidth.

In typical trunking systems, mapping is accomplished via use of a hashing algorithm on source and destination addresses (either layer 2, layer 3 or both) or priority (based upon explicit tags, such as the Internet Protocol (IP) Type of Service (TOS) tag, differentiated services or 802.3 QoS fields. These methods result in a dynamic or statistical mapping of packets received via a first trunk group coupled to source ports in a first Mux/Demux to destination ports in a second Mux/Demux. As such, no minimum packet loss or bandwidth utilization of destination ports of the second Mux/Demux which are coupled to respective links of a second trunk group can be guaranteed.

It would therefore be desirable to have a system for efficiently mapping packets received over n communication links of a first trunk group at n corresponding ports of a first Mux/Demux device for transmission over m communication links of a second trunk group driven by m corresponding ports of a second Mux/Demux device that is communicably coupled to said first Mux/Demux device via a high-speed communications link.

BRIEF SUMMARY OF THE INVENTION

A method and apparatus for coupling a first trunk group comprising n links to a second trunk group comprising m links is disclosed. A first Mux/Demux device receives packets over the n communication links at n corresponding ports of the first Mux/Demux device. The n communication links comprise links of the first trunk group. The first Mux/Demux device inserts within the received packets a port identifier tag that identifies the port at which the respective packet has been received. The packets are transmitted by the first Mux/Demux device over a high-speed link for receipt by a second Mux/Demux device. The second Mux/Demux device has m output ports for communicating over m corresponding links of the second trunk group. A port translation table is maintained at the second Mux/Demux device. The port translation table is indexed by the port identifier tag within each received packet to obtain the identity of the specific output port of the second Mux/Demux device to be employed for the transmission of the respective packet. The packets are then transmitted out of the port specified by the port translation table. Auto-configuration of the port translation table may be employed in accordance with predetermined mapping techniques to identify the links of the second trunk group to be employed for packets received over links of the first trunk group.

Other features, functions and aspects of the invention will be apparent from the Detailed Description of the invention that follows.

BRIEF DESCRIPTION OF THE SEVERAL VIEWS OF THE DRAWING

The invention will be more fully understood by reference to the following detailed description of the invention in conjunction with the drawings of which.

DETAILED DESCRIPTION OF THE INVENTION

Figure 1:
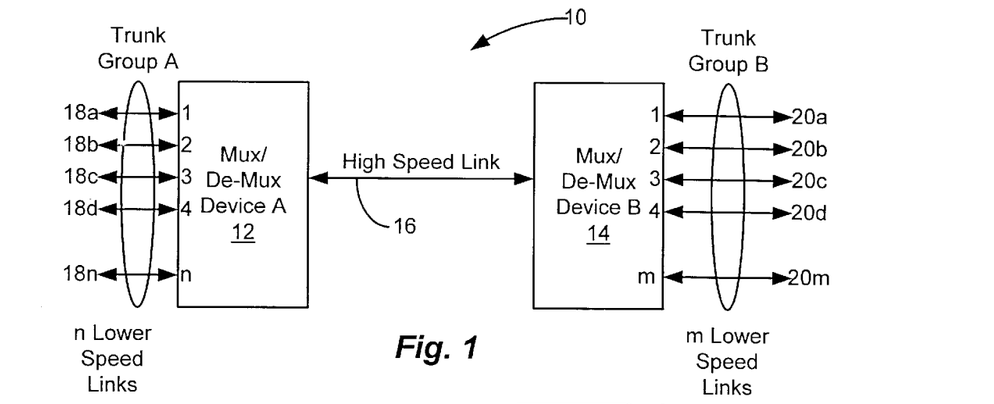
FIG. 1 is a diagrammatic representation of a system including Mux/Demux devices operative in accordance with the present invention.

A system that is operative in accordance with the present invention for mapping a packet received over a communication link of a first trunk group for transmission over a link of a second trunk group is disclosed. The system is generally depicted in FIG. 1 and includes a first Mux/Demux device 12 that is coupled to a second Mux/Demux device 14 via a high-speed link 16. The first Mux/Demux device 12 has a plurality of ports identified as ports 1 through n for receiving and transmitting packets over a corresponding plurality of communication links 18a through 18n respectively. The communication links 18a through 18n are configured as a first trunk group identified as trunk group A. While the communication links 18a through 18n are illustrated as being bi-directional for ease of illustration, it should be appreciated that the links may comprise pairs of unidirectional serial links coupled to each of the respective ports; one for receiving packets at the respective port and the other for transmitting packets from the respective port.

The trunk Mux/Demux device 14 is coupled to a plurality of communication links 20a through 20m via ports 1 through m. The communication links 20a through 20m are configured as a second trunk group which is identified as trunk group B. The number n of links within the first trunk group may equal but need not equal the number of links m within the second trunk group. As discussed above with respect to the communication links in the first trunk group, though the communication links 20a through 20m are depicted as being bi-directional, such links may comprise pairs of serial links which are coupled to ports of the second Mux/Demux device; one for transmitting packets from the respective port and one for receiving packets from the respective port.

Additionally, though the high-speed link 16 is illustrated as being bi-directional this link may comprise a pair of serial links. One link of the high-speed link 16 pair may be employed for carrying packets from the trunk Mux/Demux device 12 to the trunk Mux/Demux 14 and the other link of the pair may be employed for carrying packets in the reverse direction.

The operation of the presently described system is discussed below with respect to packets received via links within trunk group A, transmitted from the trunk Mux/Demux device A 12 over the high-speed link 16 to the trunk Mux/Demux device B 14 and transmitted over selected links of trunk group B. It should be recognized however that packets may be received over communication links within trunk group B, communicated over the high-speed link 16 to the Mux/Demux device 12 and transmitted out of selected ports of the Mux/Demux device 12 onto selected links of trunk group A. Thus, while certain functions are attributed herein to the Mux/Demux device 12 and the Mux/Demux device 14, it will be appreciated that in a typical system, the Mux/Demux devices typically include the same functionality and the specific functions employed at each device will depend upon the direction of respective packet transmissions.

More specifically, a packet received over a link within trunk group A is received at the corresponding port of the Mux/Demux device 12. The Mux/Demux device 12 marks the received packet with a unique port identifier that identifies the port of the trunk Mux/Demux device A 12 on which the respective packet was received. The port identifier is included within the packet in a port identifier tag (PIT) field. The packet with the included port identifier tag is multiplexed onto the high-speed link 16 and transmitted over the link 16 for receipt by the trunk Mux/Demux device 14.

Figure 2:
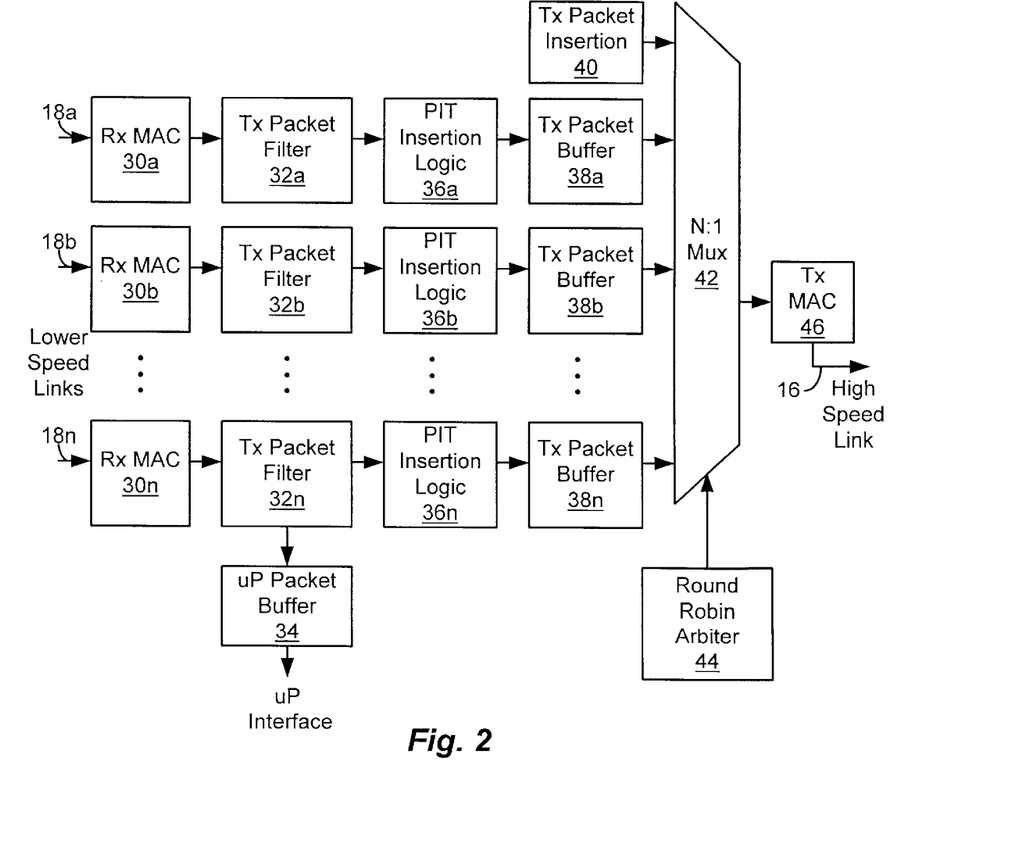
FIG. 2 is a block diagram depicting the transmit path of a Mux/Demux device of the type depicted in FIG. 1.
Figure 4:
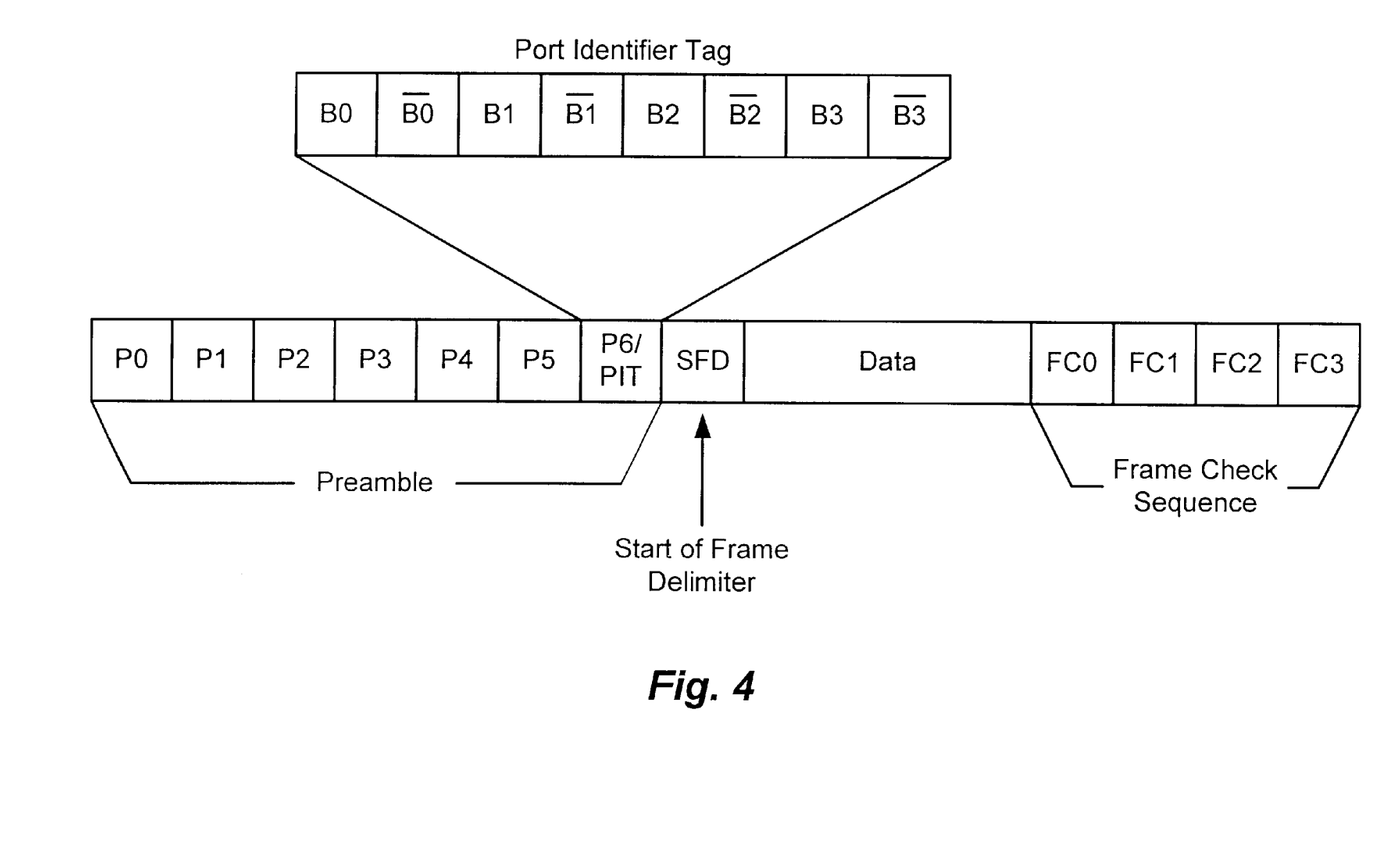
FIG. 4. is a diagram of a packet including a port identifier tag field.

An illustrative embodiment of the transmit path through a Mux/Demux device, such as the Mux/Demux device 12, assuming that packets are received on trunk group A, is depicted in FIG. 2. Referring to FIG. 2, media access control (MAC) interfaces 30a–30n are provided for the respective ports 1 to n for packets received from the respective communication links 18a through 18n. The packets received on the links 18a through 18n are parsed by the respective MAC interfaces 30a through 30n. Packets that are not destined for transmission over the high-speed link 16, such as management or configuration packets, are redirected by transmit packet filter logic, 32a through 32n respectively, to a microprocessor packet buffer 34. The redirected packets are stored in the microprocessor packet buffer 34 and are accessible by a microprocessor 73 over a microprocessor interface. The packets remaining after packet filtering by the packet filtering logic 32a–32n are destined for the high-speed link 16. A unique port identifier that identifies the port within the Mux/Demux device 12 on which the packet was received is inserted within these packets by the PIT Insertion logic 36a to 36n, as applicable. The format for an illustrative packet that includes the port identifier tag field is depicted in FIG. 4. As illustrated in FIG. 4, an exemplary packet includes a preamble, a start of frame delimiter, a data field and a frame check sequence. In a preferred embodiment, the port identifier tag (PIT) is stored in the last byte of the preamble. The PIT comprises an eight-bit value that is substituted for the normal preamble character. Since the PIT is not within the frame check sequence (FCS) of the packet, the FCS need not be recalculated when the tag is added or removed.

In the illustrated embodiment, the port identifiers for ports coupled to links within trunk group A are restricted to be within the range of 0 and 14 which limits the number of ports in the incoming port groups to 15. The value 15 is unused, as this state would encode to the standard preamble byte pattern 10101010 after Manchester encoding is applied as discussed below.

The PIT however, maintains most of the properties of the preamble sequence. In particular, the port identifier tag maintains a minimum Hamming distance of two to permit single bit errors within the tag to be detected. Additionally, the port identifier tag includes four bits of information so that 15 ports within the input trunk group can be accommodated. Furthermore, the port identifier tag never produces a start of frame delimiter (SFD) sequence of 10101011 or the preamble sequence of 10101010. Additionally, the port identifier tag contains at least half the transition density of the preamble sequence 10101010 and maintains DC balance over the tag.

Manchester encoding is preferably employed for the encoding of the incoming port number within the port identifier tag field. Manchester encoding is achieved by appending the inverse of each bit after the respective bit, i.e., state zero is encoded as 01 and state one is encoded as 10. Encoding of the PIT tag in the above-described manner allows the tag to be stored in a standard Ethernet packet.

After the port identifier tag is inserted in the respective packet, the packets to be transmitted over the high-speed link 16 are stored in transmit packet buffers 38a through 38n as applicable. Finally, the packets are multiplexed through an N:1 multiplexer 42 and transmitted over the high-speed link 16 via a transmit media access control (MAC) interface 46.

In the circumstance in which the high-speed link 16 has more bandwidth than the aggregate of the bandwidths of the links of trunk group A, multiplexing may be done in a round robin sequence under the control of a round robin arbiter 44.

In the case in which the aggregate of the bandwidths of the links within trunk group A is greater than the bandwidth of the high-speed link 16, a more complex scheduling technique may be employed.

Traffic entering from links within trunk group A can be classified into a number of per-link priority queues using either explicit tags, which may be present in the packets, or by examining the contents of the packet and mapping packet type to priority queue. Several explicit tags could be present within a packet and used for this purpose. The 802.1P tag, when present, gives the priority of the packet on a per hop basis. The Internet Protocol Type of Service (IP ToS) tag, when present, gives the priority of an Internet Protocol (IP) packet. A Differentiated Services ago (diff serv) tag, when present, gives a more detailed priority of an Internet Protocol (IP) packet.

Alternatively, the Mux/De-Mux could examine the contents of the packet to determine packet type and deduce a priority. This can be done either on a per packet basis (stateless inspection) or by examining packets within the context of their flows (state aware inspection)

Once the packets have been prioritized into different queues, an arbiter can be used to send the packets on the high-speed link that takes into account packet priority. Strict priority arbitration and weighted priority arbitration are two well know techniques for this purpose.

Strict priority arbitration takes all the packets from the highest priority queues per port within trunk group A before taking packets from the next priority queues,etc., until all the priority queues from all the ports are addressed. Only the highest priority queues are reached in case of congestion.

Weighted priority arbitration chooses to service a queue based on the premise that each port within trunk group A should have equal access to the high-speed link, at a given priority level, on a bytes per second basis. A certain level of service can also be guaranteed for lower priority traffic. In this way high priority traffic cannot completely block the passage of lower priority traffic through the Mux/De-Mux.

Figure 3:
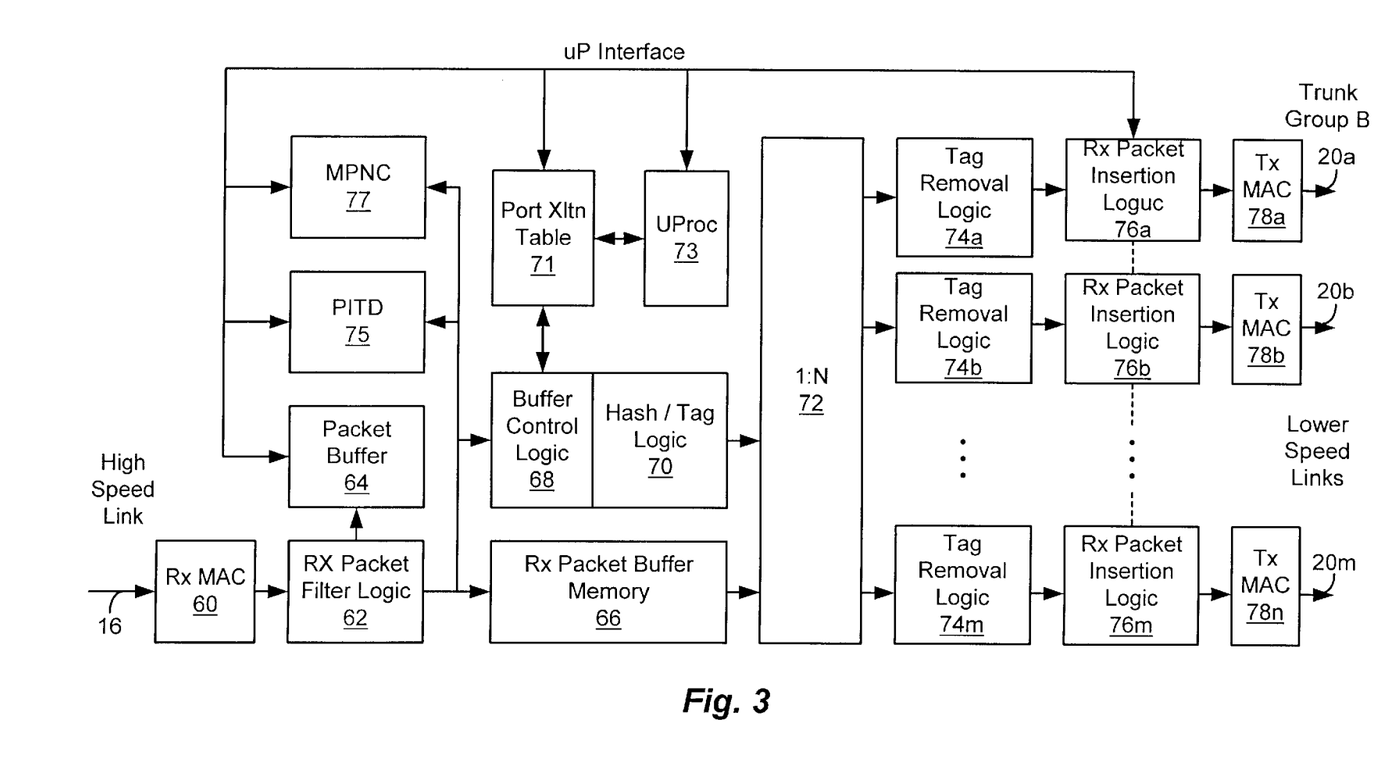
FIG. 3 is a block diagram depicting the receive path of a Mux/Demux device of the type depicted in FIG. 1.

The operation of the receive path of a trunk Mux/Demux device within the presently disclosed system is depicted in FIG. 3. In the present example, it is assumed that FIG. 3 corresponds to the receive path within the Mux/Demux device 14 and packets are received from the Mux/Demux device 12 over the high-speed link 16. The packets received at the Mux/Demux device 14 via the high-speed link 16 include the port identifier tags inserted into the packets by the Mux/Demux device 12. Referring to FIG. 3, packets are received from the high-speed link 16 at a receive media access control (MAC) interface 60. The received packets are forwarded to receive packet filter logic 62 that removes from the packet stream packets that are not destined for trunk group B.

The packets that are not destined for trunk group B are stored within a packet buffer 64 that is readable by a microprocessor 73. The microprocessor 73 may access the packets stored in the packet buffer 64 for further analysis and processing. The packets that are not filtered out of the data stream by the receive packet filter logic 62, i.e., the packets destined for trunk group B, are stored within a receive packet buffer memory 66. A pointer to each packet stored in the packet buffer memory 66 plus the port identifier tag contained within the respective port identifier tag field is stored within a buffer control block 68. The buffer control block accesses the packets from the receive packet buffer memory 66 according to preconfigured priority rules. For each packet a preconfigured port translation table 71 is accessed that is indexed by the port identifier tag for the respective packet to look up the destination port to be employed for the respective packet. The packets are next forwarded from the receive packet buffer memory 66 through the 1:N de-multiplexer 72 to the applicable output port path for transmission of the respective packet from the destination port specified in the port translation table. Since the port identifier tag is no longer required, the tag is removed by the tag removal logic 74a through 74m, as applicable. This tag removal logic, in a preferred embodiment replaces the port identifier tag with a predetermined preamble code. Any management packets that are destined for the respective output ports of the trunk group B are multiplexed into the data stream via receive packet insertion logic 76a through 76m, as applicable, and the resulting packet streams are transmitted from the respective output ports over the corresponding links 20a through 20m of trunk group B via transmit MAC interfaces 78a through 78m, as applicable.

The port translation table 71 within the receive path is used by the trunk Mux/Demux device 14 to map the port identifier tag to a destination output port identifier as discussed above. The port translation table 71 is maintained under the control of microprocessor 73. Mapping of the port identifier tags to the destination output ports may be automatically configured via use of auto configuration routines discussed below. Alternatively, the automatic configuration routines may be manually overridden and the port translation tables may be managed manually as an administrative function.

To aid with auto-configuration of the port translation table 71, certain hardware features are provided. In particular, a port identifier tag detector (PITD) 75 is employed, as shown in FIG. 3, to detect the presence of the port identifier tag field within the incoming packets. The port identifier tag detector 75 asserts a port identifier tag output signal after the reception of three consecutive port identifier tags without error. Additionally, the port identifier tag detector 75 de-asserts the detector output signal on reception of three consecutive port identifier tags that contain the standard preamble value 10101010. The assertion of the PIT detector 75 output signal initializes an auto-configuration routine. The PITD 75 signals its state to the microprocessor 73 either through an interrupt or through a port identifier tag present flag in a status register.

Additionally, each Mux/Demux device maintains a Max Port Number Counter (MPNC) 77 that monitors the input port numbers recovered from the port identifier tag fields in the respective packets. The Max Port Number Counter 77 records the highest port number observed by the trunk Mux/Demux device 14. The Max Port Number Counter 77 may be cleared by the microprocessor 73 or cleared via an aging process when the highest port number is not seen for a predetermined period of time. The Max Port Number Counter (MPNC) 77 is reset when the receive media access control logic 60 within the Mux/Demux device 14 is initialized. After a relatively brief period of time, the Max Port Number Counter 77 will typically indicate the number of ports in trunk group A.

The auto-configuration routine detects the presence of PIT tags on the high-speed link 16 from the PITD 75 and determines the number of ports in trunk group A from the Max Port Number Counter 77. The number of output ports in trunk group B is known by the microprocessor 73 within the trunk Mux/Demux device 14 since such information comprises configuration information for the device.

The input and output port numbers fall into one of three categories and the port translation table is configured differently depending on the relationship of the numbers of input ports within trunk group A 18 to output ports in trunk group B 20. More specifically, the number of input ports for links within trunk group A is equal to the number of output ports for links within trunk group B, exceeds the number of output ports for links within trunk group B, or is less than the number of output ports for links within trunk group B. The configuration of the port translation table in these differing cases is discussed below.

Case 1: The number of links in Trunk A and the number of links in Trunk B are equal In the event the number of ports associated with trunk group A 18 equals the number of ports associated with trunk group B 20, the port translation table 71 provides a one-to-one mapping between the input ports of Mux/Demux device A 12 and the output ports of the Mux/Demux device B 14. For example, traffic from input port one of Mux/Demux device 12 is routed to output port one of Mux/Demux device 14, input port two of Mux/Demux 12 is mapped to output port two of Mux/Demux 14, etc.

Shown below is an example of mapping under these conditions. In the illustrated example, eight input ports of the Mux/Demux device 12 receiving packets from trunk group A are mapped onto eight output ports of the Mux/Demux 14 driving communication links within the trunk group B.

TABLE 1

Example of Port Translation Table when the number of Trunk Group A links equals the number of Trunk Group B Links

| Input Port Number | Output Port Number |
|---|---|
| 0 | 0 |
| 1 | 1 |
| 2 | 2 |
| 3 | 3 |
| 4 | 4 |
| 5 | 5 |
| 6 | 6 |
| 7 | 7 |

The number of links in Trunk A exceeds the number of links in trunk B

In the circumstance in which the number of links in trunk group A exceeds the number of links in trunk group B, the port numbers associated with the trunk group A links 18 wrap around and map over the output port numbers. Any excess input ports associated with trunk group A may continue to be wrapped onto output ports until al input ports have been mapped. This gives a deterministic mapping but the number of input ports mapped to each output port will not be the same for all output ports. This, in general, results in uneven traffic loading of the output ports.

Shown below is an example of mapping under these conditions. In the illustrated example ten input ports are mapped onto four output ports. Input ports 8 and 9 are classified as a remainder and are mapped to output ports 0 and 1.

TABLE 2

Example of Port Translation Table in which the number of links within trunk group A exceed the number of links within trunk group B

| Input Port Number | Output Port Number |
|---|---|
| 0 | 0 |
| 1 | 1 |
| 2 | 2 |
| 3 | 3 |
| 4 | 0 |
| 5 | 1 |
| 6 | 2 |
| 7 | 3 |
| 8 | 0 |
| 9 | 1 |

In an alternative embodiment, the ports comprising the reminder after mapping of other input ports may be hashed over the total number of output ports using standard trunking techniques. This method exhibits statistical behavior and the traffic is equal on each of the output ports on average. This method typically provides better performance than standard trunking methods.

Shown below is an example of a port translation table 71 in which the input ports comprising the remainder ports after mapping of other input ports equally across output ports are hashed across the available output ports. In the illustrated example, ten input ports are mapped onto 4 outputs ports. Input ports 8 and 9 are classified as the remainder ports and are hashed across all the available output ports (0 through 3) in trunk group B via hash logic 70 depicted in FIG. 3.

TABLE 3

Example of Port Translation Table in which the number of links within trunk group A exceed the number of links within trunk group B

| Input Port Number | Output Port Number |
|---|---|
| 0 | 0 |
| 1 | 1 |
| 2 | 2 |
| 3 | 3 |
| 4 | 0 |
| 5 | 1 |
| 6 | 2 |
| 7 | 3 |
| 8 | Hash across ports 0 . . . 3 |
| 9 | Hash across ports 0 . . . 3 |

Case 3: The number of links in Trunk A is less than the number of links in Trunk B In this case the input ports are mapped one-to-one onto the output ports and the remaining unused output ports are turned off in trunk group B. If the links in trunk group A have higher bandwidth than the links in trunk group B then hashing across all available output ports may give better performance. This condition is indicated by excessive packet loss in the Mux/Demux device 14. Upon detection of this condition, the Mux/Demux device 14 reconfigures to execute the standard hashing algorithm. Trunk performance under these conditions becomes statistical.

Shown below is an example of mapping under these conditions. Four input ports are mapped onto eight output ports.

TABLE 4

Example of Port Translation Table in which the number of links within trunk group A is less than the number of links within trunk group B

| Input Port Number | Output Port Number |
|---|---|
| 0 | 0 |
| 1 | 1 |
| 2 | 2 |
| 3 | 3 |
| Not used | 4 |
| Not used | 5 |
| Not used | 6 |
| Not used | 7 |

In the case where the links in the input trunk have higher bandwidth than the links in the output trunk group then hashing across all available output ports via use of the hash logic 70 depicted in FIG. 3 may give better performance. Hashing under these conditions is shown below.

TABLE 5

Example of Port Translation Table in which input trunk links are hashed across all available output trunk links

| Input Port Number | Output Port Number |
|---|---|
| 0 | Hash across ports 0 . . . 7 |
| 1 | Hash across ports 0 . . . 7 |
| 2 | Hash across ports 0 . . . 7 |
| 3 | Hash across ports 0 . . . 7 |

It will be understood by those of ordinary skill in the art that modifications to and variations of the above-described methods and apparatus for mapping input trunk links to output trunk links within a data communication system may be made without departing from the inventive concepts herein described. Accordingly, the invention should not be viewed as limited except as by the scope and spirit of the appended claims.

What is claimed is:

1. A method for identifying one of a plurality of output ports of a first Mux/Demux device coupled to corresponding first communication links confirmed as a first trunk group for transmission of a packet received from a second Mux/Demux device having a plurality of input ports coupled to corresponding second communication links configured as a second trunk group, the number of input ports of said second Mux/Demux device associated with said second trunk group exceeding the number of output ports of said first Mux/Demux device associated with said first trunk group, said method comprising:

storing in a port translation table output port identifiers in a round robin sequence indexed by port identifier tags;

receiving at said first Mux/Demux device from said second Mux/Demux device via a communication path, a packet having a preamble containing one of said port identifier tags that identifies one input port of said plurality of second Mux/Demux device input ports on which the respective packet was received;

identifying one of said plurality of output ports of said first Mux/Demux device for transmission of said packet from said port translation table indexed by said one of said port identifier tags;

disassociating said one of said port identifier tags from said packet; and transmitting said packet out of said first Mux/Demux device from the port specified by said port translation table.

2. A method for identifying one of a plurality of output ports of a first Mux/Demux device coupled to corresponding first communication links configured as a first trunk group for transmission of a packet received from a second Mux/Demux device having a plurality of input ports coupled to corresponding second communication links configured as a second trunk group, the number of input ports of said second Mux/Demux device associated with said second trunk group exceeding the number of output ports of said first Mux/Demux device associated with said fit trunk group, said method comprising:

storing in a port translation table in a round robin sequence output port identifiers identifying said output ports associated with said first trunk group indexed by port identifier tags i times, where i is an integer, and hashing any remaining port identifier tags across all available output ports of said first Mux/Demux device associated with said first trunk group receiving at said first Mux/Demux device from said second Mux/Demux device via a communication path, a packet having a preamble containing one of said port identifier tags that identifies one input port of said plurality of second Mux/Demux device input ports on which the respective packet was received;

identifying one of said plurality of output ports of said first Mux/Demux device for transmission of said packet from said port translation table indexed by said one of said port identifier tags;

disassociating said one of said port identifier tags from said packet; and transmitting said packet out of said first Mux/Demux device from the port specified by said port translation table.

3. A method for generating a port translation table within a first Mux/Demux device having a plurality of output ports associated with a first trunk group, said method comprising the steps of:

receiving a plurality of packets at said first Mux/Demux device from a second Mux/Demux device having a plurality of input ports corresponding to ports of a second bunk group, wherein each of said packets has an associated port identifier tag that identifies one input port of said plurality of second Mux/Demux device input ports on which the respective packet was received;

detecting a largest port identifier mag of said plurality of received port identifier tags to identify the number of ports within said second trunk group;

ascertaining the number of output ports within said plurality of output ports to determine the size of said first trunk group; and configuring said port translation table in accordance with a mapping technique selected based upon the relative sizes of said second trunk group and said first trunk group.

4. The method of claim 3 wherein said configuring step includes the step of storing in said port translation table a unique output port identifier that is indexed by each port identifier tag in the event the number of input ports of said second Mux/Demux device associated with said second trunk group equals the number of output ports of said first Mux/Demux device associated with said first trunk group.

5. The method of claim 3 wherein said configuring step includes the step of storing in said port translation table said output port identifiers in a round robin sequence indexed by said port identifier tags in the event the number of input ports of said second Mux/Demux device associated with said second trunk group exceeds the number of output ports of said first Mux/Demux device associated with said first trunk group.

6. The method of claim 3 wherein said configuring step includes the step of storing in said port translation table, in a round robin sequence, output port identifiers associated with said first Mux/Demux device output ports, wherein said output port identifiers are stored in said table i times, where i is a specified integer, and each of said output port identifiers is indexed by one of said port identifier tags, and hashing any remaining port identifier tags across said plurality of output ports of said first Mux/Demux device in the event the number of input ports of said second Mux/Demux device associated with said second trunk group exceeds the number of output ports of said first Mux/Demux device associated with said first trunk group.

7. A method for identifying one of a plurality of output ports of a first Mux/Demux device coupled to corresponding first communication links configured as a first trunk group for transmission of a packet received from a second Mux/Demux device having a plurality of input ports coupled to corresponding second communication links configured as a second trunk group, the number input ports of said second Mux/Demux device being less than the number of output ports of said first Mux/Demux device, said method comprising:

receiving at said first Mux/Demux device from said second Mux/Demux device via a communication path, a packet having a preamble containing a port identifier tag that identifies one input port of said plurality of second Mux/Demux device input ports through which the respective packet was received;

selecting one of said plurality of output ports of said first Mux/Demux device for transmission of said packet, based on at least in part of said port identifier tag, wherein said selecting comprises distributing packets received through said plurality of input ports across said plurality of output ports;

disassociating said port identifier tag from said packet; and transmitting said packet out of said first Mux/Demux device from the selected one of said plurality of output ports.

* * * * *

UNITED STATES PATENT AND TRADEMARK OFFICE
CERTIFICATE OF CORRECTION

PATENT NO. : 6,788,682 B1
DATED : September 7, 2004
INVENTOR(S) : Myles Kimmitt

It is certified that error appears in the above-identified patent and that said Letters Patent is hereby corrected as shown below:

Title page,
Item [57], ABSTRACT,
Line 12, "devices." should read -- device --;
Lines 16-18, delete "Each packet is transmitted out of the corresponding port indentified within the port translation table.";

Column 7,
Line 26, "al" should read -- all --;
Line 54, "reminder" should read -- remainder --;

Column 9,
Line 10, "confirmed" should read -- configured --
Line 45, "fit" should read -- first --

Column 10,
Line 13, "bunk" should read -- trunk --; and
Line 18, "mag" should read -- tag --.

Signed and Sealed this

Twenty-eighth Day of June, 2005

JON W. DUDAS
*Director of the United States Patent and Trademark Office*